United States Patent

Modisette et al.

[11] 3,981,156
[45] Sept. 21, 1976

[54] VAPOR RECOVERY SYSTEM AND METHOD

[75] Inventors: Jerry L. Modisette, Nassau Bay; Otto F. Schkade, Houston, both of Tex.

[73] Assignee: Ecology Control, Inc., Houston, Tex.

[22] Filed: Feb. 3, 1975

[21] Appl. No.: 546,453

[52] U.S. Cl. ........................... 62/54; 62/513; 55/88; 55/89; 55/94; 220/85 VR; 261/115; 261/126
[51] Int. Cl.² ................................. F17C 7/02
[58] Field of Search ..................... 55/88, 89, 94; 220/85 VR, 85 VS; 62/54, 513; 261/115, 126

[56] References Cited
UNITED STATES PATENTS

| | | | |
|---|---|---|---|
| 2,765,872 | 10/1956 | Hartman et al. | 55/88 |
| 2,849,150 | 8/1958 | Tompkins, Jr. | 220/85 X |
| 3,266,262 | 8/1966 | Moragne | 62/54 |
| 3,648,436 | 3/1972 | Schonewald et al. | 55/88 |
| 3,714,790 | 2/1973 | Battey | 62/54 |
| 3,739,551 | 6/1973 | Eckert | 55/94 X |

*Primary Examiner*—William F. O'Dea
*Assistant Examiner*—Ronald C. Capossela
*Attorney, Agent, or Firm*—Bill B. Berryhill

[57] ABSTRACT

A method of recovering vapors from exhausts or vents of containers of volatile substances comprising the steps of: providing a scrubber for connection to the vapor space of the container to receive a flow of vapors therefrom; providing a reservoir of absorber fluid; cooling the absorber fluid; introducing the cooled absorber fluid into the scrubber for intimate contact with the flow of vapors therethrough; and returning the vapors absorbed by the cooled absorber fluid to the container. The scrubber may include a spray nozzle adapted to spray cooled absorber fluid in a direction generally concurrent with the flow of vapors. Alternate methods of returning absorbed vapors to the container are disclosed.

27 Claims, 4 Drawing Figures

VAPOR RECOVERY SYSTEM AND METHOD

BACKGROUND OF THE INVENTION

1. Field of the Invention

The present invention pertains to the recovery of vapors of volatile substances. More specifically, the invention pertains to methods and apparatus for recovering the vapors of volatile substances from exhaust of storage tank vents, tank truck vents, industrial or chemical processes, and the like.

2. Brief Description of the Prior Art

In handling of volatile substances, such as fluid hydrocarbons, two phases are generally present: a condensed or liquid phase and a vapor phase which is generally in equilibrium therewith. The vapor phase creates a problem in handling and particularly in storage or transfer of the substance. For example, as a storage tank is filled with the volatile substance, vapors, which may also be mixed with air, are displaced by the substance being added to the tank and unless the tank is designed for high pressures, these vapors must be exhausted. For unpressurized tanks, there may also be daily exhaust, commonly called "breathing", due to temperature and atmospheric pressure changes.

The exhausting of vapors to the atmosphere results in a loss of valuable material. Furthermore, the exhaust vapors of most volatile substances contribute to air pollution and may be subject to state and Federal regulations, usually in the form of maximum allowable concentration of vapor emanating from the exhaust.

Several methods have been developed to reduce or eliminate vapor exhaust. Of course, one is the provision of tanks or containers of high pressure capabilities. Such methods are economically feasible only for small storage volumes. Probably one of the most common methods is to provide the storage tank with a floating roof which rises or falls with the increase or decrease in pressure. Floating roofs are relatively expensive and are only applicable to stationary tanks of cylindrical shape and with vertical axes.

In recent years, more sophisticated and economical methods have been developed. In one general group of methods, vapor is withdrawn from the storage vessel, compressed and cooled to produce condensate. The condensate is then returned to the storage vessel. An example of such a method is shown in U.S. Pat. No. 3,150,495. In another group of methods, liquid is withdrawn from the storage tank, cooled and sprayed into the vapor space of the tank primarily to cool the tank and reduce vapor pressures for filling or storage. Representative of these methods is the one described in U.S. Pat. No. 3,733,838.

There are, of course, several variations to these general methods. For example, U.S. Pat. No. 2,938,360 discloses a method in which tank vapors are fed into a condensor in which liquid, taken from the storage tank, is sprayed. However, there is no refrigeration of the liquid sprayed. A similar method is shown in U.S. Pat. No. 3,648,436 in which the entire liquid in the storage tank is refrigerated. Such a totally refrigerated system is relatively expensive to operate and to maintain. U.S. Pat. No. 3,714,790 discloses a relatively complex system involving refrigeration condensation and vapor compression.

As is evident from the many methods developed to date, no one method or system for recovering vapors has become universally accepted. Some are suitable for certain applications while undesirable for others. Many systems are relatively complex and expensive in construction and operation. With today's emphasis on conservation of our natural resources and abatement of pollution, more efficient and inexpensive methods are needed.

SUMMARY OF THE INVENTION

In the present invention, a vapor scrubber is connected to the vapor space of the container of a volatile substance for receiving flow of vapors therefrom; a reservoir of absorber fluid is provided from which a stream of absorber fluid is cooled and introduced into the scrubber for intimate contact with the flow of vapors therethrough. The absorbed vapors are then returned, by alternate methods, to the container.

The vapor scrubber may be provided with a spray nozzle for spraying the cooled absorber fluid in a direction generally concurrent with the flow of vapors. The scrubber may also be provided with one or more packing elements, at least one of which may be in the path of the spray, to increase the area of heat transfer between the spray and vapor flow.

The absorber fluid for the system may be alternatively supplied from the scrubber or directly from the storage container and may be fluid from the stored volatile substances therein. In an alternate method of the invention, the more volatile components of the stored substances may be removed, prior to cooling, to provide a less volatile absorber fluid. In still another alternate embodiment, a separate absorber liquid may be provided. In this embodiment, means is provided to separate the absorbed vapors from the independent absorber fluid for return to the container.

In summary, the system and methods of the present invention recover exhaust vapors by absorption in a refrigerated spray. The spray material may be the substance in the tank, an extract of the stored substance with the more volatile components removed, or a separate absorbing substance. The spray is emitted in a unique absorber scrubber, especially adapted for use with conventional tank storage. The efficiency, simplicity, flexibility and low cost of construction and operation of the vapor recovery system and methods of the present invention make them highly suitable for many vapor recovery applications. Other objects and advantages will be apparent from reading the specification which follows in conjunction with the accompanying drawings.

DESCRIPTION OF THE PREFERRED EMBODIMENT

Figure 2:
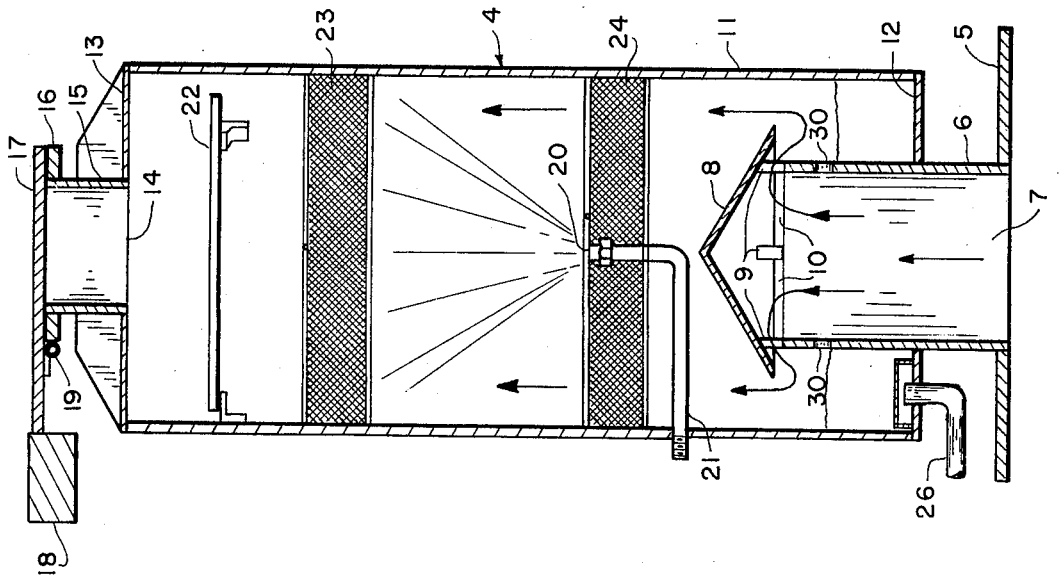
FIG. 2 is an elevation view, in section, of an absorber scrubber, suitable for use with the system of FIG. 1, according to a preferred embodiment of the invention.
Figure 1:
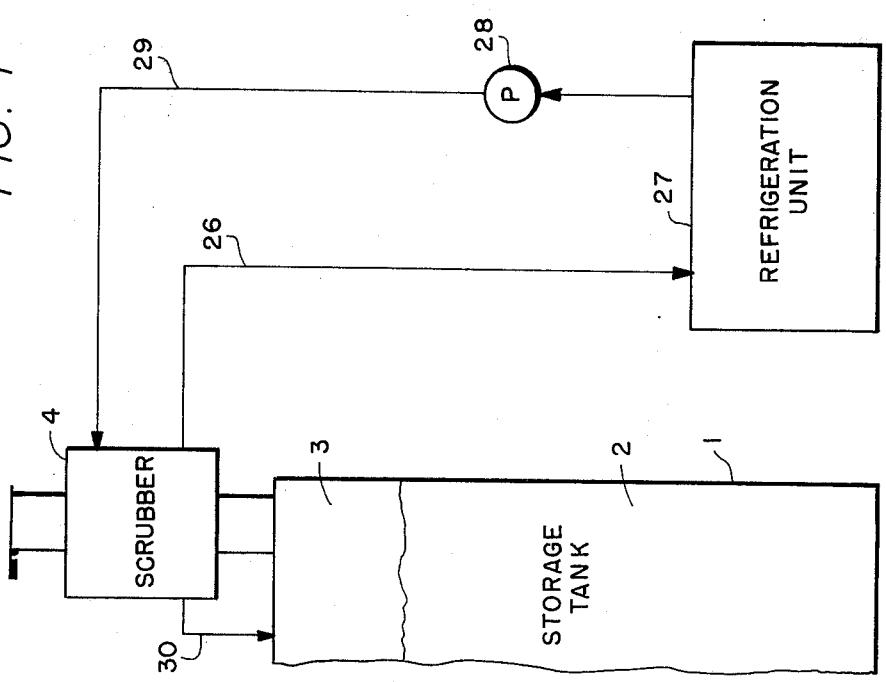
FIG. 1 is a schematic representation of a vapor recovery system according to a preferred embodiment of the invention.

Referring first to FIGS. 1 and 2, a vapor recovery system, according to a preferred embodiment of the invention, will be described. As shown, a storage tank or container 1 is provided for storage of a volatile substance 2, e.g., benzene. Usually a vapor space 3 is present within the container, containing vapors in equilibrium with the condensed substance 2. Mounted on the top of container 1 is an absorber scrubber 4 which is in fluid communication with the vapor space 3 thereof.

As best seen in FIG. 2, the absorber scrubber 4 may comprise a flange portion 5 by which the scrubber may be attached to the container. A vent stack 6, having an opening 7, may extend upwardly from the flange 5 for providing communication between the tank vapor space and the scrubber 4. A conical deflector 8 may be welded to the upper end of vent stack 6 but spaced therefrom by vertical spacers 9 so that vapors from the container may flow through the vent stack 6, through the circumferential passages 10, and into the cylindrical enclosure 11 of the scrubber 4.

The cylindrical enclosure 11 is closed at the bottom by annular plate 12 and at the top by annular plate 13. The upper end 13 of the scrubber may open at 14 into an exhaust stack 15 which may be surrounded at its upper end by flange member 16. A closure device such as a pivoted blind flange 17 may be provided at the upper end of exhaust stack 15. Such a device may be counterbalanced with weight 18 and mounted on a pivot 19 so as to open the upper end of exhaust stack 15 in the event that the internal pressure of scrubber 4 reaches a preselected level. Of course, safety valves, rupture discs or any other type of pressure release may be provided.

A spray nozzle 20 may be disposed within the scrubber above deflector 8 for spraying absorber fluids supplied through conduit 11 in a direction, as shown, generally concurrent with the flow of vapors from the container to which the scrubber is attached. A baffle plate 22 may be provided near the upper end of the scrubber to arrest upward movement of the spray and to prevent unwanted escape of the spray through the exhaust stack 15 in the event the stack is open.

A metallic packing element 23 may be disposed below baffle 22 in the path of the nozzle spray to increase the area of heat transfer within the scrubber. A lower packing element 24 may also be provided below the nozzle for additional heat transfer area. The baffle plate 22 itself provides some heat transfer area. The metallic packings also serve to reduce the explosion hazard due to the accumulation of static electricity.

The function of the scrubber 4 is to absorb and/or condense vapors flowing through the scrubber and vent stack 6 from the vapor space of the container to which it is attached. Relatively warm vapors flow through the scrubber and into intimate contact with a chilled spray of absorber fluid emanating form nozzle 20. The vapors are absorbed and/or condensed by the cooled spray and fall with the absorber fluid toward the bottom of the cylindrical enclosure 11 for collection therein. In fact, the bottom portion of the scrubber surrounding the vent stack 6 may be thought of as a sump. It should be noted that the term "absorbed vapors" as used in the specification refers to vapors collecting in the sump whether they are absorbed or condensed by the absorber fluid.

Referring again to FIG. 1, it will be seen that the sump portion of scrubber 4 is connected by a conduit 26 to a refrigeration unit 27. The refrigeration unit 27 may be one of any suitable known design for cooling the absorber fluid returned thereto from the scrubber sump. A circulating pump 28 may be provided at the discharge of refrigeration unit 27 for transferring the chilled absorber fluid, through conduit 29, to the spray nozzle of scrubber 4. Various valves and controls, well known in the art, may be used to regulate the flow of absorber fluid from the scrubber, through refrigeration and back again to the scrubber.

In operation, the sump of scrubber 4 serves as an absorber fluid reservoir from which absorber fluid flows to refrigeration unit 27. The absorber fluid is cooled or chilled and returned via pump 28 and conduit 29 to the spray nozzle of scrubber 4. Further refrigeration takes place in the expansion of the absorber fluid through the nozzle. As the vapors exit from the vapor space 3 of the storage container 1, they come into intimate contact with the chilled spray and the packing elements within the scrubber, causing the vapor to be absorbed and/or condensed and collected in the sump area of the scrubber. The sump provides makeup for the absorber fluid. Additional collected absorbed vapors are returned, via an overflow return 30 to the storage tank or container 1. The cycle is continuous.

Figure 3:
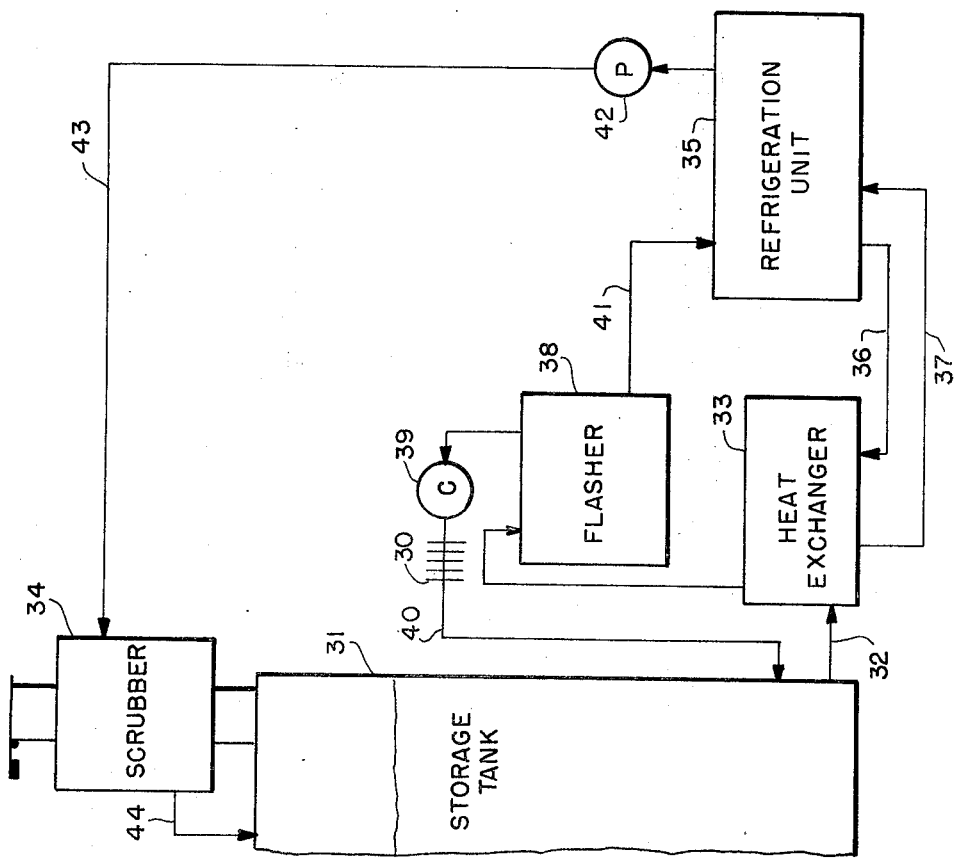
FIG. 3 is a schematic representation of a vapor recovery system in which absorber fluid is obtained directly from the storage container, according to an alternate embodiment of the invention.

Referring now to FIG. 3, an alternate vapor recovery system and method will be described. In this method, the absorber fluid is taken directly from the storage tank or container 31 rather than the scrubber 23. However, more volatile components of the substance within the storage tank 31, e.g. gasoline, may be removed so that the absorber fluid will be more efficient in its absorbing and condensing action than it would be using all components of the substance within storage tank 31. Separation of the more volatile components may be effected by first transferring the stored substance, via conduit 32, to a heat exchanger 33. Heat may be applied by a direct fired burner or other means such as heat exchange between the hot gases of the refrigeration unit 35 and the substance from the storage tank. To accomplish such heat exchange, a hot gas line 36 and a return condensed refrigerant line 37 may be provided.

In any event, the substance from the storage tank is heated within the heat exchanger 33 and passed to a flasher 38 where the more volatile components are vaporized and separated from the less volatile components. The flasher 38 may be placed under a partial vacuum by a compressor 39. The compressor 39 also takes the vaporized more volatile components, compresses and returns them, via return line 40, to the storage tank or container 31. The vapors discharged from compressor 39 may be cooled, e.g. by air cooler 30, before return to enhance reabsorption into the product stored in container 31.

The less volatile components, generally in a liquid state, are passed via line 41 to the refrigeration unit 35 where they are cooled or chilled to become the absorber fluid for scrubber 34. The chilled absorber fluid is then transferred by pump 42, via line 43, to the spray nozzle of absorber scrubber 34.

The absorber scrubber 34 is essentially the same as the one shown in FIG. 2, except that its sump is not connected directly to the refrigeration unit 35. Instead, all of the abosrber fluid and vapors absorbed thereby within the scrubber 34 are returned, via return line 44, from the scrubber to the storage tank or container 31.

Figure 4:
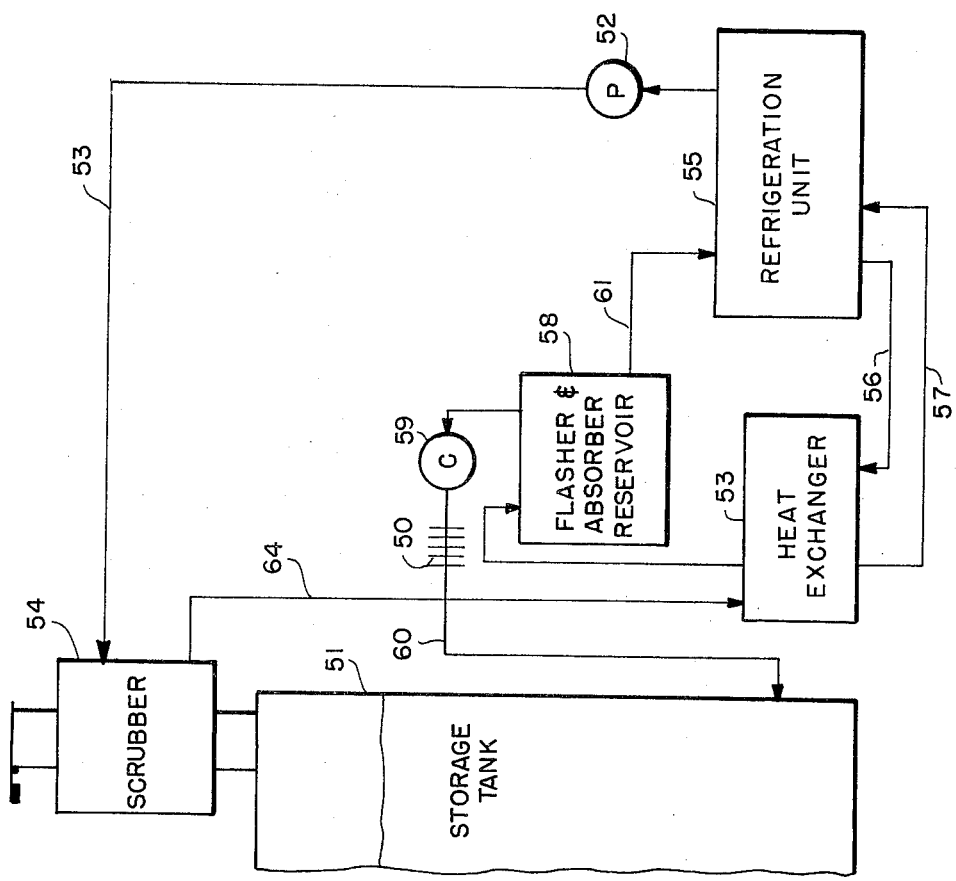
FIG. 4 is a schematic representation of a vapor recovery system in which an independent absorber fluid is provided, according to an alternate embodiment of the invention.

Referring to FIG. 4, still another vapor recovery system nd method, according to an alternate embodiment of the invention will be described. Like in the other embodiments, a scrubber 54, similar to scrubbers 4 and 34, is attached in communication with the vapor space of storage tank 51. However, unlike the other embodiments, the scrubber 54 is not provided with a direct return to storage tank 51. This is due to the fact that an independent absorber fluid, other than the substance within the storage tank 51, is to be provided. This system is particularly desirable when the substance of storage tank 51 is of such a nature, e.g. petroleum, that it is not suitable for handling by refrigeration unit 55.

To understand this system, it would perhaps be better to start at the absorber reservoir 58, which may also serve as a flasher unit, as will be more fully understood hereafter. The absorber fluid may be a selected material of substantially less volatility than the substance within the storage tank 51. For example, if the substance of storage tank 51 is petroleum, the absorber fluid may be diesel oil. The absorber fluid is passed via line 61 to refrigeration unit 55 where it is cooled and from which it is transferred, via pump 52 and conduit 53, to the scrubber 54. The chilled absorber fluid is sprayed in the scrubber, essentially in the same manner as in the previously described embodiments. The chilled absorber fluid and the vapors absorbed thereby fall to the sump area of the scrubber 54. No direct return is provided from the scrubber 54 to the storage tank 51.

Some means must then be provided for separating the absorbed vapors from the absorber fluid. This may be accomplished much as in the system of FIG. 3 by a heat exchanger 53 and the flasher 58. The absorber fluid and absorbed vapors are transferred, via line 64, to the heat exchanger 53 where they are heated, either by direct heat or by heat transfer from the hot gases of the refrigeration unit 55. In the latter case, hot gas line 56 and condensed refrigerant line 57 may be provided. By heating these materials, the more volatile components of the absorbed vapors are vaporized and separated in the flasher 58 from the less volatile absorber fluid. As in the system of FIG. 3, the flasher may be maintained at a partial vacuum by compressor 59. Compressor 59 is also used to draw off the revaporized absorbed vapors, compressing them and returning them via line 60 to the storage tank 51. As in the system of FIG. 3, the vapor discharged from compressor 59 may be cooled, e.g. by air cooler 50, befoe return, to enhance reabsorption into the product stored in container 51. The absorber fluid is then recycled through the refrigeration unit 55 and the cycle continuously repeated.

If desired, the air cooler 50 could be replaced by a refrigeration unit to fully condense the returning vapors. Then part or all of the condensed vapors could be drawn off as a liquid for use.

Although the separation of more volatile components from less volatile components is effected in the systems of FIG. 3 and FIG. 4 by a combination of heating and vacuum distillation, it should be understood that either heating or vacuum distillation alone could be used. In fact, there are probably several ways of accomplishing such separation of the more volatile components from less volatile components.

In summary, the systems of the present invention require some reservoir means for supplying absorber fluid to the system, refrigeration means for cooling the absorber fluid, means for introducing the cooled absorber fluid into the path of vapors received in a scrubber connected to the vapor space of the storage container, and means for returning vapors absorbed in the scrubber to the container. Obviously, there are several ways to provide such means. In fact, many variations of the invention can be devised by those skilled in the art without departing from the spirit of the invention. It is therefore intended that the scope of the invention be limited only by the claims which follow.

We claim:
1. A method of recovering vapors from containers of volatile substances comprising the steps of:
   a. providing a scrubber connected to the vapor space of said container for receiving a flow of vapors therefrom;
   b. providing absorber fluid by taking a stream of said container substances and removing the more volatile components thereof;
   c. cooling said absorber fluid;
   d. introducing said cooled absorber fluid into said scrubber for intimate contact with said flow of vapors; and
   e. returning the vapors absorbed in said scrubber by said cooled absorber fluid to the container.

2. The method of claim 1 in which said more volatile components are removed by heating said stream of container substances to vaporize said more volatile components for separation and return to said container.

3. The method of claim 2 in which said more volatile components are compressed prior to said return to said container.

4. The method of claim 3 in which said heated stream of container substances is fed into an enclosure under partial vacuum to further aid in removal of said more volatile components prior to said return to said container.

5. The method of claim 3 in which said more volatile components are cooled prior to said return to said container.

6. A method of recovering vapors from containers of volatile substances comprising the steps of:
   a. providing a scrubber connected to the vapor space of said container for receiving a flow of vapors therefrom;
   b. providing a reservoir of absorber fluid;
   c. cooling said absorber fluid;
   d. introducing said cooled absorber fluid into said scrubber for intimate contact with said flow of vapors; and
   e. returning the vapors absorbed in said scrubber by said cooled absorber fluid to the container;
   f. said absorber fluid being a substance substantially less volatile than said volatile container substances, said reservoir comprising the lower portion of said scrubber in which said absorber fluid and absorbed vapors may collect, said absorbed vapors being removed before said cooling of said absorber fluid.

7. The method of claim 6 in which said absorbed vapors are removed by heating said absorbed fluid and absorbed vapors as they are discharged from said scrubber to revaporize said absorbed vapors.

8. The method of claim 7 in which said heated and revaporized absorbed vapors are compressed and returned to said container.

9. The method of claim 8 in which said heated absorber fluid and absorbed vapors are subjected to a partial vacuum prior to said compression and return of said revaporized absorbed vapors to said container.

10. The method of claim 8 in which said heated and revaporized absorbed vapors are cooled before said return to said container.

11. A system for recovering vapors from containers of volatile substances comprising:
- a vapor scrubber connected to the vapor space of said container for receiving vapors therefrom;
- reservoir means in the lower portion of said scrubber for supplying absorber fluid to said system;
- refrigeration means connected to said reservoir means for cooling said absorber fluid;
- means for introducing said cooled absorber fluid into the path of vapors received in said scrubber to absorb said vapors for collection in said reservoir with said absorber fluid; and
- means for returning at least a portion of the vapors absorbed by said cooled absorber fluid to said container;
- said scrubber communicating with said container vapor space through a conduit having an opening in said scrubber, said opening being provided with a deflector to prevent passage of said absorber fluid and said vapors absorbed thereby through said opening.

12. A vapor recovery system as set forth in claim 11 in which said scrubber means comprises vent means responsive to an increase in pressure within said scrubber to vent at least some of said vapors received from said container vapor space.

13. A vapor recovery system as set forth in claim 11 in which said means for introducing said cooled absorber fluid into said vapor path comprises a spray nozzle adapted to spray said cooled absorber fluid in a direction generally concurrent with said vapor path.

14. A vapor recovery system as set forth in claim 11 in which said vapor scrubber includes packing means in the path of said vapor and the spray of said spray nozzle to increase the heat transfer of said scrubber.

15. A vapor recovery system as set forth in claim 14 in which said vapor scrubber includes second packing means in the path of said vapor but upstream of said spray.

16. A vapor recovery system for recovering vapors from containers of volatile substances comprising:
- a vapor scrubber connected to the vapor space of said container for receiving vapors therefrom;
- reservoir means in the lower portion of said scrubber for supplying absorber fluid to said system;
- refrigeration means connected to said reservoir means for cooling said absorber fluid;
- means for introducing said cooled absorber fluid into the path of vapors received in said scrubber to absorb said vapors for collection in said reservoir with said absorber fluid; and
- means for returning at least a portion of the vapors absorbed by said cooled absorber fluid to said container;
- said lower portion of said scrubber being connected to said container by an overflow conduit through which excess absorber fluid and vapors absorbed thereby may return to said container.

17. A system for recovering vapors from containers of volatile substances comprising:
- a vapor scrubber connected to the vapor space of said container for receiving vapors therefrom;
- flasher means connected to said container for removing the more volatile components from a stream of said container substance to supply absorber fluids to said system;
- refrigeration means connected to said flasher means for cooling said absorber fluid;
- means for introducing said cooled absorber fluid into the path of vapors received in said scrubber; and
- means for returning vapors absorbed by said cooled absorber fluid to said container.

18. A vapor recovery system as set forth in claim 17 in which said means for removing said more volatile components comprises a heat exchanger in which said container substances are heated as they pass through for vaporizing said more volatile components.

19. A vapor recovery system as set forth in claim 18 comprising a vapor return line connected between the downstream side of said heat exchanger and said container for returning said more volatile components to said container.

20. A vapor recovery system as set forth in claim 19 comprising cooling means connected to said vapor return line for cooling said more volatile components prior to said return to said container.

21. A vapor recovery system as set forth in claim 19 including flasher means between said heat exchanger and said refrigeration means into which said heated container substances are passed, compressor means connected to said flasher and said vapor return line for compressing said more volatile components before their return to said container.

22. A system for recovering vapors from containers of volatile substances comprising:
- a vapor scrubber connected to the vapor space of said container for receiving vapors therefrom;
- reservoir means for supplying absorber fluid to said system;
- refrigeration means connected to said reservoir means for cooling said absorber fluid;
- means for introducing said cooled absorber fluid into the path of vapors received in said scrubber; and
- means for returning vapors absorbed by said cooled absorber fluid to said container;
- said absorber fluid being a substance substantially less volatile than said volatile container substances, said reservoir means comprising the lower portion of said scrubber, and including means, between said scrubber and said refrigeration means, for removing said absorbed vapors from said absorber fluid before passage of said absorber fluid through said refrigeration means.

23. A vapor recovery system as set forth in claim 22 in which said means for removing said absorbed vapors from said absorber fluid comprises a heat exchanger in which said absorber fluid and absorbed vapors are heated to vaporize said absorbed vapors prior to passage of said absorber fluid through said refrigeration means.

24. A vapor recovery system as set forth in claim 23 in which said means for returning said absorbed vapors comprises flasher means between said heat exchanger and said refrigeration means in which heated vaporized absorbed vapors are separated from said absorber fluid for return to said container via a vapor return line connected to said container.

25. A vapor recovery system as set forth in claim 24 in which a compressor is connected in said vapor return line to compress said heated vaporized absorber vapors.

26. A vapor recovery system as set forth in claim 25 in which said flasher means is maintained at a partial vacuum by said compressor.

27. A vapor recovery system as set forth in claim 25 comprising cooling means in said vapor return line on the discharge side of said compressor to cool said heated vaporized absorber vapors before said return to said container.

* * * * *